United States Patent [19]
Batcher

[11] 3,812,467
[45] May 21, 1974

[54] PERMUTATION NETWORK

[75] Inventor: Kenneth E. Batcher, Stow, Ohio

[73] Assignee: Goodyear Aerospace Corporation, Akron, Ohio

[22] Filed: Sept. 25, 1972

[21] Appl. No.: 291,850

[52] U.S. Cl. .............................................. 340/172.5
[51] Int. Cl. .......................... G06f 7/00, H03k 19/00
[58] Field of Search .......... 340/146.1, 172.5; 444/1; 307/303

[56] References Cited

UNITED STATES PATENTS

| | | | |
|---|---|---|---|
| 3,371,320 | 2/1968 | Lachenmayer | 340/172.5 |
| 3,400,379 | 9/1968 | Harman | 340/172.5 |
| 3,593,317 | 7/1971 | Fleisher et al. | 340/172.5 |
| 3,404,373 | 10/1968 | Srinivasan | 340/146.1 AL |
| 3,474,413 | 10/1969 | Dryden | 340/146.1 AL |
| 3,577,186 | 5/1971 | Mitchell | 340/146.1 AL |

*Primary Examiner*—Paul J. Henon
*Assistant Examiner*—Michael Sachs
*Attorney, Agent, or Firm*—Oldham & Oldham

[57] ABSTRACT

The instant invention relates to a unique logic network whereby data into and out of the memory array of a specialized digital computer will be permuted such that the data will maintain a convenient and consistent order on a data interface. The network may be constructed using commonly-available *n*-channel data selectors. Fundamentally, the invention functions in conjunction with a digital computer memory array whose data storage pattern is such that accesses to the stored data may be made in word-oriented mode, bit-oriented mode, or mixed-oriented mode, the latter comprising characteristics of the two aforementioned modes. The invention requires a minimum amount of extra-network control circuitry, and comprises a plurality of uniquely identical smaller networks of such size that they may be readily packaged on individual printed circuit boards such that a minimum of inter-board wire connections are necessary. Further, the similarity of smaller networks facilitates maintainability of the entire network.

5 Claims, 16 Drawing Figures

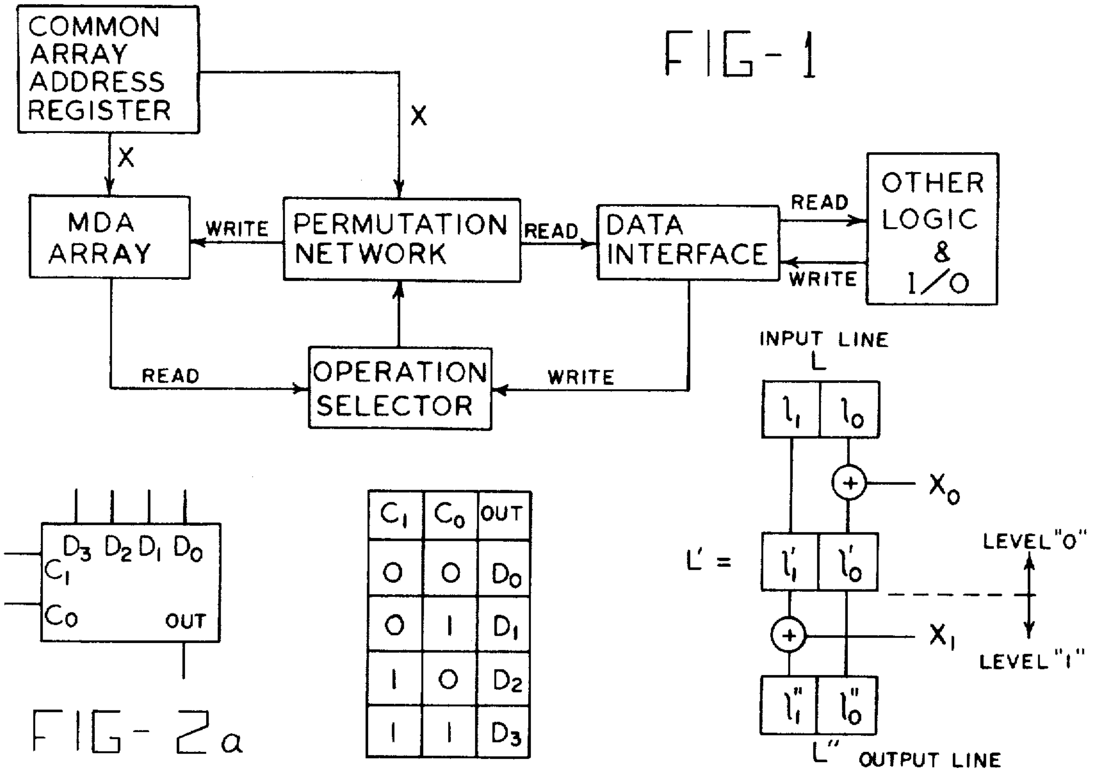
FIG-1 FIG-2a FIG-3b
| $C_1$ | $C_0$ | OUT |
|---|---|---|
| 0 | 0 | $D_0$ |
| 0 | 1 | $D_1$ |
| 1 | 0 | $D_2$ |
| 1 | 1 | $D_3$ |
FIG-2b
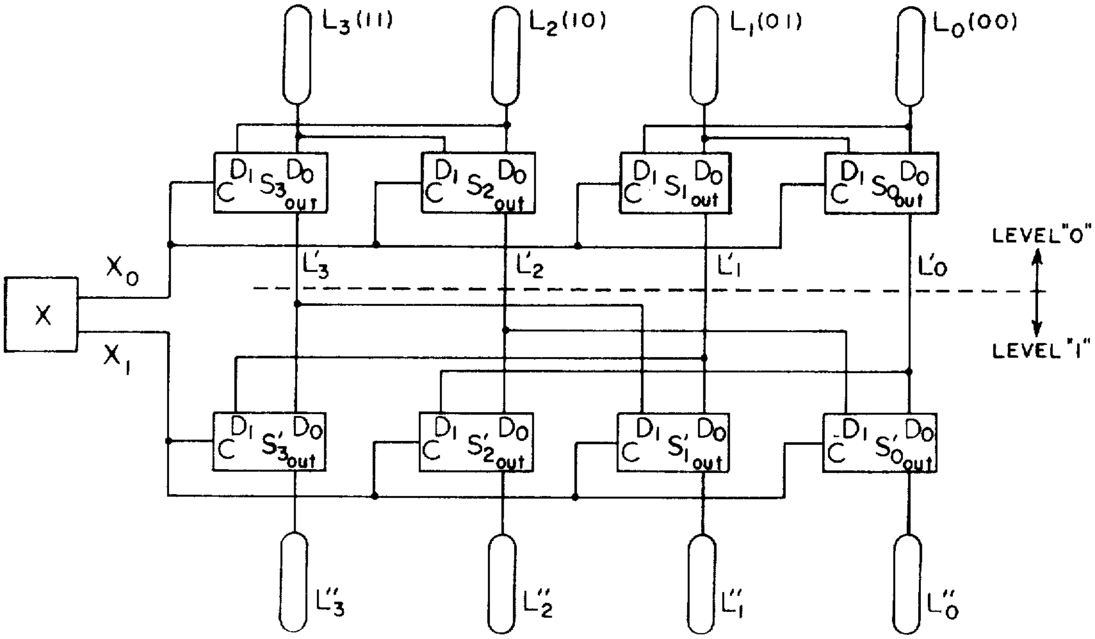
FIG-3a SHIFT 1
| NO. of LINES | L | | | X | | | L''' | | |
|---|---|---|---|---|---|---|---|---|---|
| | $l_2$ | $l_1$ | $l_0$ | $X_2$ | $X_1$ | $X_0$ | $l_2'''$ | $l_1'''$ | $l_0'''$ |
| 4 | – | – | 0 | 0 | 0 | 1 | – | – | 1 |
| 2 | – | 0 | 1 | 0 | 1 | 1 | – | 1 | 0 |
| 1 | 0 | 1 | 1 | 1 | 1 | 1 | 1 | 0 | 0 |
| 1 | 1 | 1 | 1 | 1 | 1 | 1 | 0 | 0 | 0 |
FIG-7a
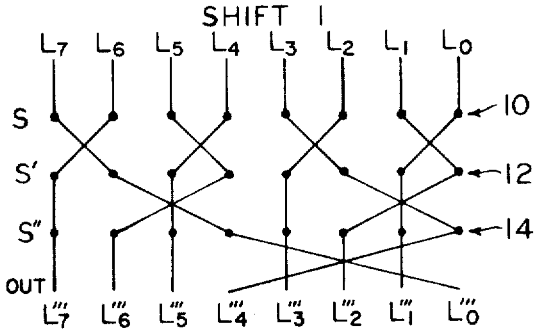
FIG-8a
SHIFT 2
| NO. of LINES | L | | | X | | | L''' | | |
|---|---|---|---|---|---|---|---|---|---|
| | $l_2$ | $l_1$ | $l_0$ | $X_2$ | $X_1$ | $X_0$ | $l_2'''$ | $l_1'''$ | $l_0'''$ |
| 4 | – | 0 | – | 0 | 1 | 0 | – | 1 | – |
| 2 | 0 | 1 | – | 1 | 1 | 0 | 1 | 0 | – |
| 2 | 1 | 1 | – | 1 | 1 | 0 | 0 | 0 | – |
FIG-7b
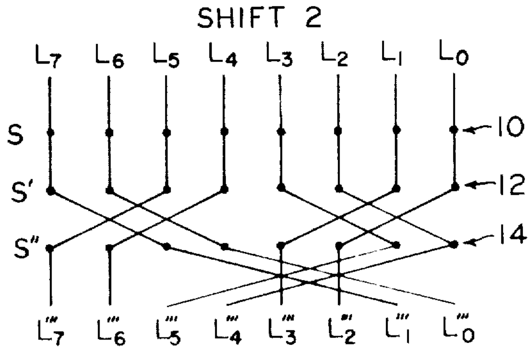
FIG-8b
SHIFT 4
| NO. of LINES | L | | | X | | | L''' | | |
|---|---|---|---|---|---|---|---|---|---|
| | $l_2$ | $l_1$ | $l_0$ | $X_2$ | $X_1$ | $X_0$ | $l_2$ | $l_1$ | $l_0$ |
| 4 | 0 | – | – | 1 | 0 | 0 | 1 | – | – |
| 4 | 1 | – | – | 1 | 0 | 0 | 0 | – | – |
FIG-7c
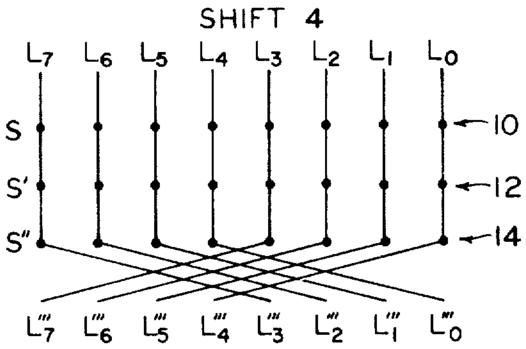
FIG-8c

PERMUTATION NETWORK

BACKGROUND OF THE INVENTION

Heretofore it has been known that digital computers can be constructed such that access to the data stored in the memory array might be achieved in one unique manner. Conventional general purpose digital computers have been designed such that access may only be made to one bit of all words or a bit-oriented access. The memory arrays of either of these types of digital computers may readily be constructed utilizing commonly available solid state memory modules such as the 256-bit bipolar random access memory module, IM 5503, produced by Intersil Memory Corporation of Cupertino, California. Using such memory modules, a $2^n$-word by $2^n$-bit per word memory would require $2^n$ modules, each containing $2^n$ bits. If such a memory array were to be constructed for a general purpose digital computer, the data would be stored in memory such that each module would contain the same bit of all words. The basic storage rule would be that bit B of memory word W would be stored in bit W of memory module B, where B and W could have any value from 0 to $2^n-1$. Conversely, in an associative processor type computer, each module would contain all bits of one word and data would be stored in the memory array such that bit B of word W would be stored in bit B of module W, where B and W could have any value from 0 to $2^n-1$. It follows from the data storage rules that when the memory modules of either type computer are all accessed at the same memory module bit, the data output, as referenced to the memory modules, will always be in the same order. That is, in word-oriented access, the data, as referenced to the memory modules, will be in proper bit order, and in bit-oriented access, the data, as referenced to the memory modules, will always be in proper word order.

When attempts are made to incorporate both word-oriented and bit-oriented accessing in one digital computer, it becomes apparent that certain problems relative to consistent data ordering must be overcome. Now, instead of a memory module containing all bits of one word, or the same bit of all words, it must now contain a different bit of each word. Consequently, the accessed data, as referenced to the memory modules, will not maintain a consistent order for all possible accesses. It is therefore exigent that a network be provided whereby the accessed data may always be placed in a consistent pattern in a data interface.

One approach to utilizing both word-oriented and bit-oriented accessing in one computer is to use what is known as a skewed array as defined in Report 297 by Yoichi Muraoka of the Department of Computer Science of the University of Illinois at Urbana, Illinois. Data is stored in this array in such a manner that in either mode of accessing the bits of accessed data will be in the proper order relative to each other but will be in an improper absolute order as referenced to the memory modules. Consequently, such an array requires a routing or shifting network to maintain the same relative data order but to shift the absolute data order such that the order will be consistent in the data interface for all accesses. Two basic approaches have been taken to design such a shifting network. Both approaches use commonly available $n$-channel data selectors arranged in such a manner that shifts of various magnitudes may be achieved by selecting the proper channels of the data selectors. The basic shifting network constructed of $n$-channel data selectors has the inherent drawback that each data selector must share $(n-1)$ of its inputs with neighboring data selectors. Consequently, shifting networks of any appreciable size which must be contained on a plurality of printed circuit boards will require numerous interboard wire connections.

Admittedly, shifting networks have been designed such that a large shifting network would be comprised of numerous smaller shifting networks. For example, shifting networks capable of shifting data 16 places may be readily constructed on one printed circuit board. If a plurality of these networks are tied together such that the output of one shift network is the input of another shift network then shifts in excess of 16 places may be made.

For example, to shift certain data "up" 43 places utilizing a plurality of 16-place shift networks, the first group of such shift networks would shift the first eleven bits of data "down" five places and the last five bits of data "up" 11 places. In second and third level shifting networks the data which was shifted "down" five places would be shifted "up" 48 places and the data which was shifted "up" 11 places would be shifted "up" 32 places such that all data is effectively shifted up 43 places.

Although such a shfiting network could be composed of smaller shifting networks uniquely placed on individual printed circuit boards, it is evident that complex control circuitry is required to determine which data is to be shifted "up" and which data is to be shifted "down" in the first level, and how much further shifting is required for each bit of data in subsequent shifting levels. Hence, it can be seen that when using shifting networks a trade-off must be made between a large number of interboard wire connections and the necessity of complex control circuitry.

The instant invention alleviates both of the above described problems. When used in conjunction with the multi-dimensional access solid state memory as described in co-pending patent application Ser. No. 253,388 filed May 15, 1972 and assigned to Goodyear Aerospace Corporation of Akron, Ohio, it provides for convenient, consistent ordering of accessed memory data on a data interface in such a manner that the circuitry required may be readily sectioned into unique parts such that its construction on printed circuit boards will require a minimum of interboard wire connections and network control circuitry while providing the desirable maintainability feature that the entire network is composed of a plurality of smaller identical networks, each capable of being placed on an individual printed circuit board.

As pointed out in the Background of the Invention, set forth above, it has been known that a square array of data might be stored in a set of memory modules in such a way that access to either rows or columns of the array is possible; such an approach is known as skewed storage. However, such a storage pattern requires a routing or shifting network such that the row or column being accessed will always appear in a proper order on the data interface. Approaches to developing such a shifting network have resulted in a trade-off having to be made between large numbers of interboard wire connections and complexity of extra-network control circuitry.

Therefore, it is the general object of the instant invention to circumvent the necessity of making the above-mentioned trade-off by creating a network whereby the data into or out of a multi-dimensional access solid-state memory may be consistently permuted for all modes of operation, and wherein the network may be readily sectioned such that it may comprise a plurality of identical smaller networks capable of being placed on individual printed circuit boards, and wherein a minimum amount of interboard wire connections will be necessary, and wherein extra-network control circuitry will be minimal.

A further object of the invention is to provide a logic network which is designed to coordinate with the multi-dimensional access solid state memory, the subject of the patent application identified above such that the two in combination will completely eliminate the problems inherent in skewed storage by presenting a novel data storage approach capable of handling multiple modes of data accessing while being accurate in operation, rapid in processing time, inexpensive in comparison with the present state of the art, readily maintainable, and which is highly flexible to adapt to various uses.

A further object of the invention is to provide a network which will not only arrange the order of data into and out of the memory array, but will also be capable of shifting data such that entire data fields may be shifted as to absolute position, but will maintain a constant position relative to all other data in the data field.

The aforesaid objects of the invention and other objects which will become apparent as this description proceeds are achieved by the method of permuting the lineal order of $2^n$ data sources designated by binary vector indices $M=(m_{n-1}, m_{n-2}, \ldots, m_1, m_0)$ in accordance with the state of a permutation code designated by a binary vector $X=(x_{n-1}, x_{n-2}, \ldots, x_1, x_0)$ such that the permuted position P of any data source is given by $P = M \oplus X$, where $\oplus$ means addition modulo 2.

For a better understanding of the invention, reference should be made to the accompanying drawings wherein:

FIG. 1 is a generalized block diagram of the circuitry necessary for accessing the data in an MDA array, and is presented to clarify the understanding of the invention;

FIG. 2*a* comprises the commonly accepted circuit designation for a four-channel data selector;

FIG. 2*b* is the truth table for FIG. 2*a*;

FIG. 3*a* illustrates the circuitry of a four input permutation network utilizing two-channel data selectors;

FIG. 3*b* is a chart representing the transition of an input line through the permutation network;

Figure 9:
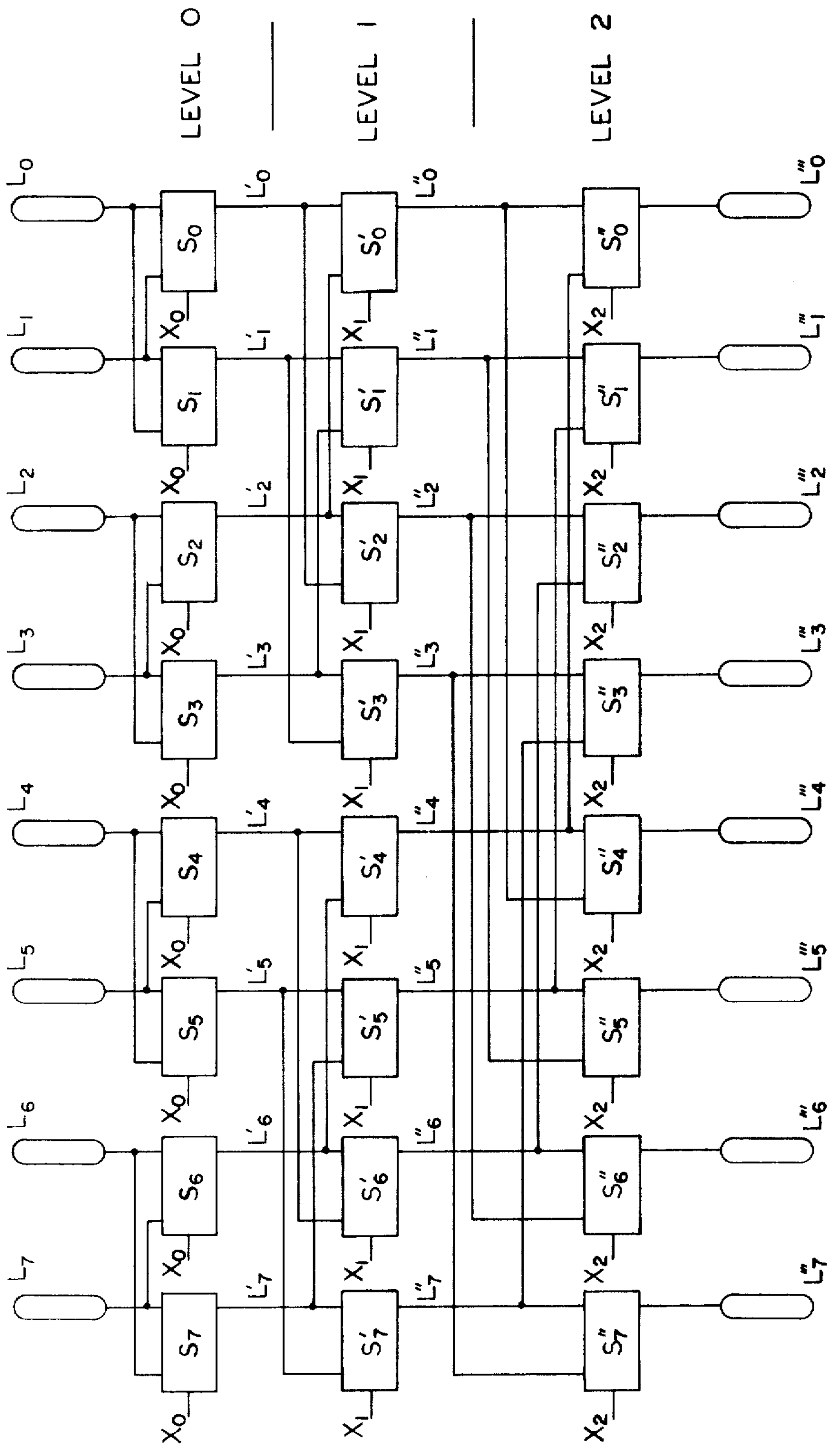
Figure 10:
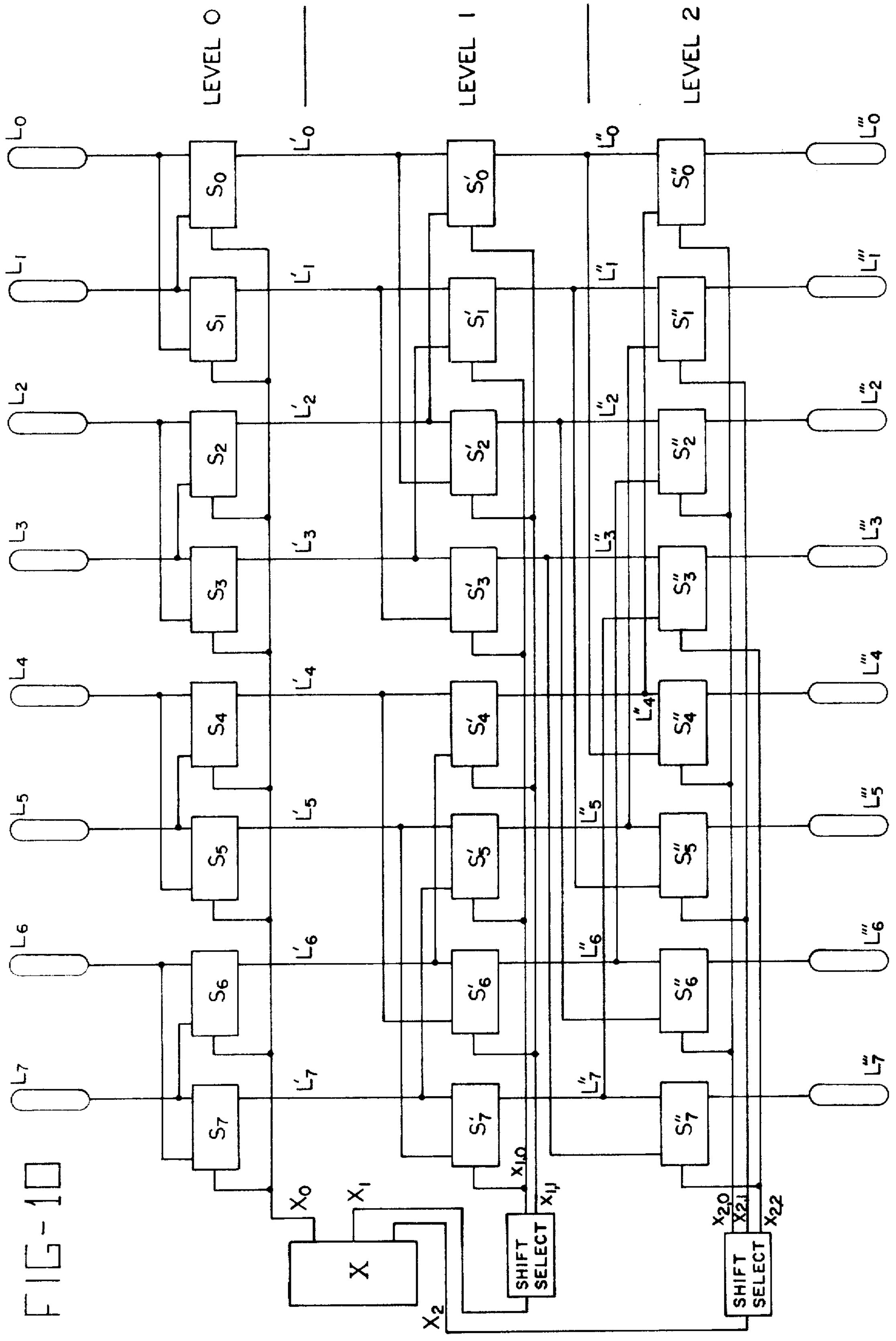

FIG. 7*a*, 7*b*, and 7*c* illustrate the relationships between input lines, output lines, and permutation codes for shifts of 1, 2, and 4 places respectively;

FIG. 8*a*, 8*b*, and 8*c*, illustrate the permuting required to accomplish shifts of 1, 2, and 4 places respectively;

FIG. 9 illustrates an 8-input permutation network wherein each data selector is capable of receiving a channel-select input independently of all other data selectors; and FIG. 10 illustrates an 8-input permutation network possessing a shifting capability.

GENERAL DESCRIPTION

A multi-dimensional access solid state memory (MDA) array such as that described in co-pending pateht application Ser. No. 253,388 filed May 15, 1972 assigned to Goodyear Aerospace Corporation of Akron, Ohio, is designed such that access may be made to the data storage bits in any one of three distinct modes: word-oriented mode allows access to all bits of one word, similar to the accessing of general purpose digital computer; bit-oriented mode allows accessing to one bit of all words, similar to the accessing of an associative processor; and mixed-oriented mode allows accessing to some bits of some words. For purposes of this description, reference shall be made to a square MDA array; the total number of words stored in the array being equal to the square root of the total number of bits stored therein. It should become evident however, that the instant invention is applicable to systems utilizing non-square arrays, also.

A $2^n$ word by $2^n$ bit per word MDA array requires $2^n$ memory modules each containing $2^n$ bits, where $n \geq 1$. Data is stored in the array in such a manner that each module contains a different bit of each of the $2^n$ words. The accessing of data in memory requires $2^n$ data input lines for writing, and $2^n$ data output lines for reading.

Since each memory module contains a different bit of each of the $2^n$ words, it is readily apparent that on the memory module data input and output lines the words, when operating in word-oriented mode, will not be in bit order as referenced to the memory modules; and the bits, when operating in bit-oriented mode, will not be in word-order as referenced to the memory modules. It is of course described that there be a data interface in which the data read from the array and the data to be written into the array may always be placed in a consistent order. It is most desirable that in word-oriented mode the least significant position in the data interface will contain the least significant bit of the word to be accessed, and the bits will be in such progressive order that the most significant position in the data interface will contain the most significant bit of the word to be accessed. Normally, it is desirable that in bit-oriented mode the least significant position in the data interface will contain the bit of the least significant word, and the bits will be in such progressive order that the most significant position in the data interface will contain the bit of the most significant word. Likewise, it is desirable that in mixed-oriented mode the groups of bits of groups of positions of bits of groups of words to be accessed will correspond to groups of positions in the data interface such that the groups in the data interface will be in word order and the positions within each group will be in bit order. The instant invention satisfied these most desirable conditions.

Referring now to the figures and more particularly FIG. 1, the relationship which the permutation network bears to the MDA array and the data interface may be seen. The common array address register contains the address of the word to be accessed in word-oriented mode, the bit to be accessed in bit-oriented mode, or combinations thereof in mixed-oriented mode. The common array address also referred to as the permutation code, may be designed by an $n$-element binary vector, $X = (x_{n-1}, x_{n-2}, \ldots, x_1, x_0)$, where each $x$ element of the vector is a 0 or a 1. The MDA array is composed of $2^n$ memory modules, each memory module having one data input line and one data output line. Each memory module is indexed by a unique binary vector, $M = (m_{n-1}, m_{n-2}, \ldots, m_1, m_0)$. The data interface contains $2^n$ data positions, one for each of the $2^n$ memory modules. Each data position is indexed by a unique binary vector, $P = (p_{n-1}, P_{n-2}, \ldots, p_1, p_0)$. The data in the MDA array is arranged in the memory modules in such a manner that the data will have a consistent order in the data interface if the relationship between the common array address, X, the memory modules, M, and the position in the data interface, P, satisfy the equation, $P = M \oplus X$, where $\oplus$ means addition modulo 2. That is, $(p_{n-1}, p_{n-2}, \ldots, p_1, p_0) = (m_{n-1} \oplus x_{n-1}, m_{n-2} \oplus x_{n-2}, \ldots, m_1 \oplus x_1, m_0 \oplus x_0)$. It should be noted then that in reading data from memory the permutation network must permute the data order such that the data on the output lne of any module M will go to position $P = M \oplus X$ in the data interface. Similarly, in writing data into memory, the permutation network must permute the order of the data placed in the data interface such that the data in any position P will be placed on the data input line of module $M = P \oplus X$. As can be see the permutation network performs the same basic function regardless of whether data is being read from the array or written into the array. That is, in both instances, the permutation network adds modulo 2, the common array address, to the binary vector index of the source of the data. When reading, as seen the above-identified patent application, the source of data is the output pin of memory module M and when writing, the source of the data is the data position P in the data interface. Consequently, the same permutation network is used for both reading and writing; an operation selector circuit is provided for selecting the input to the permutation network depending upon whether the array is to be read or written. The output of the permutation network goes to both the array and the data interface, but each contain logic gating such that the array only receives the output of the permutation network when writing and the data interface only receives the output of the permutation network when reading.

A permutation network may be readily constructed utilizing commonly available logic data selectors similar to the four-channel data selector, MC 1228, manufactured by Motorola Semiconductor Indorporated of Phoenix, Arizona. Such a data selector would typically have four data inputs, $D_0$ through $D_3$, one data output, and two binary-coded channel select inputs, $C_0$ and $C_1$, by which any of the four data inputs may be selected to appear on the output. FIG. 2*a* illustrates the commonly accepted schematic designation of the data selector and FIG. 2*b* illustrates the truth table for such a data selector. Of course, the data selectors utilized may have any number of channel inputs associated therewith. Four and eight channel data selectors are presented in DATA SHEET DS9088, published by Motorola in August, 1968.

Of course, it will be understood from an appreciation of the invention disclosed herein that the data selectors utilized in the construction of the permutation network may comprise individually discrete logic gates rather than the single packaged data selector manufactured by Motorola as described above. Indeed, any logic circuitry having encoded control gates controlling and selecting the passage of one of a plurality of inputs to a single output in accordance with the truth table of FIG. 2*b* could readily satisfy the teachings of the invention.

FIG. 3*a* illustrates that a four position permutation network may be constructed using eight two-channel data selectors. The data source lines into the permutation network; $L_0$, $L_1$, $L_2$, and $L_3$ may each be designated by using a two element binary vector, $L = (l_1, l_0)$. The permutation network control lines $X = (x_1, x_0)$ are connected to the data selector channel select inputs. It should be observed that the permutation network has been divided into two levels, the outputs of level 0 driving the inputs of level 1. The inputs of level 0, which are the inputs to the permutation network itself, each go to two data selectors. Note also that the permutation network input lines share data selectors in groups of two: $L_0$ and $L_1$ share data selectors $S_0$ and $S_1$ and lines $L_2$ and $L_3$ share data selectors $S_2$ and $S_3$. The permutation network lines are grouped according to commonality of their binary vector index. As will be noted later, in level 0, operation will be upon element $\mathbf{l}_0$ of the binary vector of the permutation network's input lines. The input lines are therefore grouped according to commonality of the vector elements other than $\mathbf{l}_0$, namely $\mathbf{l}_1$. Note that for $L_0$ and $L_1$, $l_1 = 0$ and for $L_2$ and $L_3$, $l_1 = 1$; therefore, $L_0$ and $L_1$ are grouped together and $L_2$ and $L_3$ are grouped tegether. Each input lines goes to data input $D_0$ of the data selector with which it is associated; $L_0$ goes to $D_0$ of $S_0$, and similarly, $L_3$ goes to $D_0$ of $S_3$. Each input line goes to $D_1$ of the other data selector in its group. A general wiring rule will be presented hereinafter.

Now, to appreciate the operation of the permutation network just developed, consider the schematic of FIG. 3*a* and the chart of FIG. 3*b*, illustrating the transition of the input lines through the permutation network. It can be observed that the outputs of the data selectors in level 0 are determined by the state of the channel select input, $x_0$. If $x_0$ is a 0 then the output of each data selector is its corresponding input line; the output of $S_0$ is $L_0$, of $S_1$ is $L_1$, of $S_2$ is $L_2$, and of $S_3$ is $L_3$. groups of data selectors flip their outputs, the output of $S_0$ is $L_1$, of $S_1$ is $L_0$, of $S_2$ is $L_3$, and of $S_3$ is $L_2$. It follows then that in level 0 the first element, $\mathbf{l}_0$, of the binary vector of each of the input lines, L, is added modulo 2 to the channel select input, $x_0$; that is, $l'_0 = l_0 \;\; x_0$. Note that in level 0 there was no operation upon the $\mathbf{l}_1$ elements of the binary vector index of the input lines. As a result, the outputs of the data selectors in level 0 are lines $L' = (l'_1, l'_0), = (l_1, l'_0)$. Note now that the inputs to the data selectors in level 1 of the permutation network are lines $L' = (l'_1, l'_0)$, and in this second level there is no operation upon the $\mathbf{l}'_0$ element of the binary vector L'. In level 1 the operation is similar to that in level 0 only now it is upon the $\mathbf{l}'_1$ element of the binary vector L' which is the $\mathbf{l}_1$ element of the binary vector L. The output of level 1, which is the output of the permutation network as a whole, is $L'' = 1''_1, 1''_0) = (1'_1 \oplus x_1, 1'_0) = (1_1 \oplus x_1, 1_0 \oplus x_0)$. Therefore, it can be seen that the output of the permutation network is $L'' = L \oplus X$.

GENERALIZED WIRING RULES

With reference to the above description of the operation of a simplified permutation network, generalized wiring rules for any permutation network may be presented. A permutation network is divided into levels such that in each level operations are performed on one or more of the elements of the binary vector index of input line L. The output lines of the data selectors in one level are the input lines of the data selectors in the succeeding level. The output line of any data selector is accorded the binary vector index of that data selector.

It can be appreciated then that in any permutation network, the input lines for any level are grouped such that all lines in a group have common elements in their binary vector indices except for those elements to be operated upon in that level. Each such group of lines goes to that group of data selectors which shares the same commonality of elements in their binary vector indices as do the lines. The lines and data selectors are then wired together with respect to the elements of their vector indices which are not common. That is, associated with every line L there is a binary vector $\tilde{L}$ consisting of those ordered elements of the binary vector L which are correspondingly dissimilar to those of the other lines in the group and corresponding to every data selector S there is a binary vector S consisting of the ordered elements of the binary vector $\tilde{S}$ which are dissimilar to the corresponding elements of the binary vectors of the other data selectors in the group. The wires within a group are then wired to the data selectors in the corresponding group such that line L goes to data input D of data selector S in accordance with the formula $D = \tilde{L} \oplus \tilde{S}$.

It should be noted in applying these wiring rules that the number of lines or data selectors that will appear in a group will be equal to the input capacity of the data selectors used in construction of the permutation network. If $k$-channel binary coded data selectors are used then the data selectors and their input lines will be grouped in groups of $k$ and the number of elements of the binary vector L which will be operated upon in any level of the permutation network will be equal to $\log_2 k$. Consequently, the binary vectors L an S will contain $\log_2 k$ elements which will appear in the same order relative to each other as they did in the vectors $\tilde{L}$ and $\tilde{S}$ respectively. For example, if in one level of the permutation network the elements $1_4$ and $1_5$ of the vector L are to be operated upon, then $\tilde{L} = (1_5, 1_4)$ and $\tilde{S} = (s_5, s_4)$; consequently, $D = (1_5 \oplus s_5, 1_4 \oplus s_4)$.

With reference to the permutation network as illustrated in FIG. 3*a*, it can be seen that lines $L'_0$ and $L'_2$ are grouped together as are lines $L'_1$ and $L'_3$ due to the commonality of the binary vector index element $1'_0$. Similarly, data selectors $S'_0$ and $S'_2$ are grouped together as are data selectors $S'_1$ and $S'_3$ due to commonality of the elements $s'_0$ in their binary vector indices. Therefore, to ascertain which data input line $L'_0$ goes to data selector $S'_2$, the formula would evolve to $D = \tilde{L}'_0 \oplus \tilde{S}'_2 = 0 \oplus 1 = 1$; therefore line $L'_0$ goes to data input $D_1$ of data selector $S'_2$.

Figure 4:
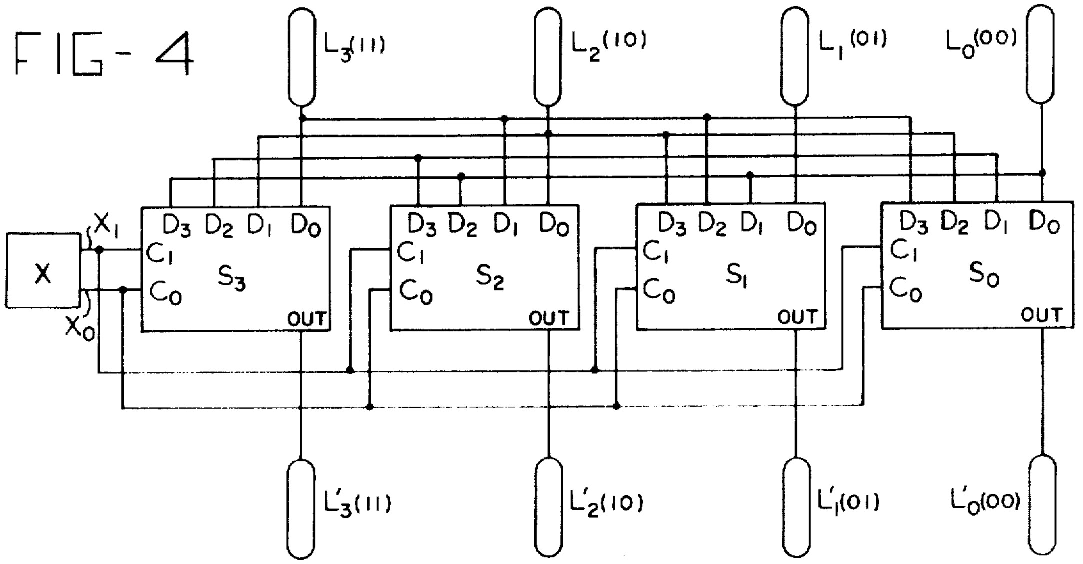
FIG. 4 illustrates that the same circuitry as illustrated in FIG. 3*a* may be simplified by using four-channel data selectors rather than two-channel data selectors.

It becomes apparent that if data selectors with a greater input capacity had been used, the permutation network of FIG. 3*a* and 3*b* might have been constructed using fewer data selectors, and the permuting operations could have all been performed on one level. FIG. 4 illustrates the construction of such a permutation ntetwork utilizing four-channel data selectors. Since each data selector is capable of handling four inputs, the data lines are arranged in groups of four and hence the permutation network now only requires one group of input lines. The wiring rules for the input lines are the same as described above but since there is only one level of operation, $\tilde{L} = L$ and $\tilde{S} =$ and $S$ in the formula $D = \tilde{L} \oplus \tilde{S}$. As illustrated in FIG. 4, the transition of the input lines (L) through the permutation network to the output lines (L') is now achieved in a single level in which two elements of the binary vector of the input lines are operated on. The result is the same as that in the prior permutation network; $L' = L \oplus X$.

It becomes evident that since permuting may be accomplished in levels, permutation networks of a large size may be constructed by connecting together, in the appropriate manner, permutation networks of a smaller size. Consider now the permutation network which would be required for operation with a 256 word by 256 bit MDA array. Such a permutation network would require 256 input lines, each represented by a unique 8-element binary vector, L. The construction of such a permutation network utilizing the smaller permutation networks as illustrated in FIG. 4 would require four levels, each level containing 64 of these smaller networks.

Figure 5:
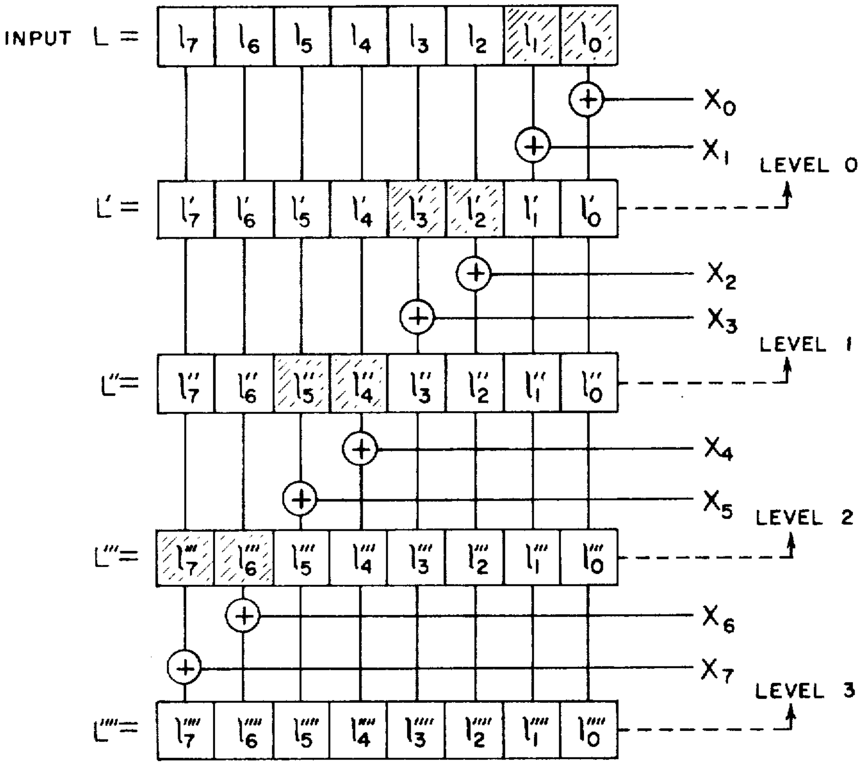
FIG. 5 illustrates the transition of an input line through a 256-input permutation network.

FIG. 5 illustrates the transition of any input line L through such permutation network to output L''''. From FIG. 5 and the wiring rules it can be observed that the input lines and the data selectors in each level will be arranged in groups of four according to the commonality of six of the eight elements of their binary vector indices. Consequently, input lines to the data selectors in level 0, which are the data source input lines to the permutation network itself, will be grouped such that all lines in a group will have common elements in their binary vector indices at $1_2$, $1_3$, $1_4$, $1_5$, $1_6$, and $1_7$. As a result, input lines $L_0$, $L_1$, $L_2$, and $L_3$ will be grouped together, as will input lines $L_{252}$, $L_{253}$, $L_{254}$, and $L_{255}$. Similarly, the data selectors will be grouped such that all data selectors in a group in level 0 will have common elements in their binary vector indices at $s_2$, $s_3$, $s_4$, $s_5$, $s_6$, and $s_7$ such that the first group will contain data selectors $S_0$, $S_1$, $S_2$, and $S_3$ and the last group will contain $S_{252}$, $S_{253}$, $S_{254}$, and $S_{255}$. The first mentioned group of input lines will go to the first mentioned group of data selectors and the last mentioned group of input lines will go to the last mentioned group of data selectors. Note that as the wiring rules are observed throughout the construction of the network, it becomes apparent that the entire network consists of a plurality of the smaller networks illustrated in FIG. 4.

Te output lines of the data selectors (S) in level 0 are the input lines (L') of the data selectors (S') in level 1. In this level, lines L' having common binary vector elements $1'_0$, $1'_1$, $1'_4$, $1'_5$, $1'_6$, and $1'_7$ are grouped together. As a result, $L'_0$, $L'_4$, $L'_8$, and $L'_{12}$ would be grouped together and would go to data selectors $S'_0$, $S'_4$, $S'_8$, and $S'_{12}$. $L'_{243}$, $L'_{247}$, $L'_{251}$, and $L'_{255}$ would be grouped together and would go to data selectors $S'_{243}$, $S'_{247}$, $S'_{251}$, and $S'_{255}$. The same pattern follows throughout the permutation network such that the input lines and data selectors in level 2 will be grouped in groups of four composed of every sixteenth line and data selector and the inputs and data selectors in level 3 will be grouped in groups of four composed of every sixty-fourth line and data selector.

Observe that in the first two levels, levels 0 and 1, the data selector grouping is such that the inter-wiring of data selectors between those levels occurs in groups of 16; that is, the outputs of the first 16 data selectors, $S_0$ through $S_{15}$, are the inputs of the first group of 16 data selectors in level 1, $S'_0$ through $S'_{15}$, and there are not other data inputs to these data selectors. The same is true for each successive group of 16 data selectors in level 0 and level 1; each such group composes a unique 16-input permutation network; note also that all inter-wiring of data selectors between levels 2 and 3 occurs within unique groups of 6, composed of every sixteenth data selector. Since the circuit operations are exactly the same in each level; that is, each input line is channeled through one of four channels depending on the state of the channel select inputs, it follows that the groups in levels 2 and 3 compose 16-input permutation networks exactly like those of levels 0 and 1.

A a consequence, the permutation network for a 256 word by 256 bit MDA array may be constructed using a plurality of 16-input permutation networks. Each of these permutation networks may be individually placed on its own printed circuit board, having only 16 signal input lines and 16 signal output lines. The interboard connections of these lines, following the basic grouping and wiring rules, allow the individual 16-input permutation networks to be unified into one 256-input permutation network.

Figure 6:
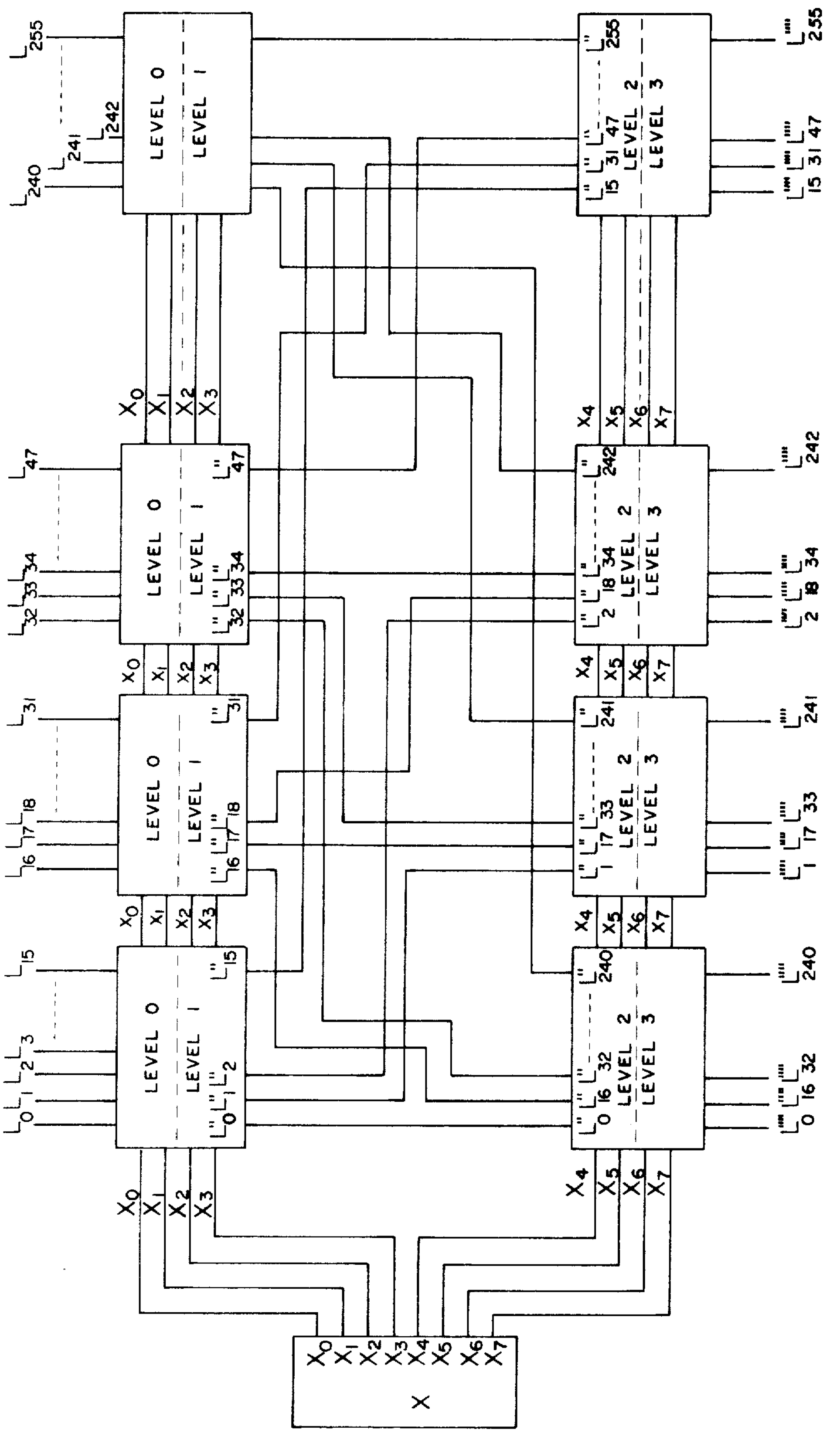
FIG. 6 illustrates the basic block diagram and wire connections of the 256-permutation network illustrated in FIG. 5.

Note that since this larger permutation network comprises smaller permutation network capable of being totally embodied on one printed circuit card, a minimum of interboard wire connections are necessary, and maintainance of the system is simplified. FIG. 6 illustrates how a 256-input permutation network might be constructed using 32 16-input permutation networks.

It should be noted that although permutation networks will normally be comprises of a plurality of identical data selectors, this need not always be the case of permutation networks may readily be constructed of a plurality of data selectors having various input capacities. In general, a $2^n$ position permutation network will require $2^n$ data selectors in each level of the network. The number of levels so required will depend upon the input capacity of the data selectors used. If the permutation network is comprises of $r$ levels of data selectors, level 0 through $r$-1, wherein any level $z$ is comprised totally of $k_z$-channel data selectors, then level $z$ will operate on $\log_2 k_z$ elements of the binary vectors L and the relationship between the number of levels, $r$, required by the network, the number of elements of the binary vector L, and the input capacities of the data selectors used in the various levels will be given by the formula:

$$n=\sum_{z=0}^{r-1} \log_2 k_z$$

When $k_z$ equal $k$ for all $z$ then the equation evolves to $n = r \log_2 k$, as can be seen from the permutation networks developed above.

Oftentimes, in computer operations, it is desirable that entire data fields be shifted; that is, each data bit maintains the same position relative to all other data bits but its absolute position in either memory or the data interface is changed. For example, if all data in an $n$-position data interface where to be shifted down one position then the data in position $P_0$ would go to position $P_1$, $P_1$ to $P_2$, and so forth throughout the data interface such that the least position, $P_{n-1}$, would shift to the first position, $P_0$. Since the ability to shift is desirable in many computer operations, the instant invention has been designed such that certain shifts will be nothing more than special cases of permutations. A $2^n$-input permutation network may readily be designed such that it will allow $n$ shifts, each shift being a power of two, from $2^0$ through $2^{n-1}$. For example, the 256-input permutation network described above could be designed such that it would have the capability of eight distinct shifts; shifts of 1, 2, 4, 8, 16, 32 64, and 128 positions.

Consider now the construction of an eight-input permutation network constructed of two-channel data selectors in such a manner that the network will be capable of both permitting and shifting. For an eight input permutation network, $n = 3$, and therefore the permutation network will be capable of making the three distinct shifts of 1, 2, and 4 positions. It should be apparent that other shifts may be achieved by making one or more passes through the permutation network. That is, a shift of three may be accomplished by passing the data through the permutation network two times; the first shifting the data one position, the second shifting it two. Similarly, a shift of seven positions could be achieved by making three passes through the permutation network; the first shifting one position, the second two positions, and the third four positions. Hence, it is only necessary to provide for the three basic shifts in the permutation network as all other shifts will be achieved by making another pass or passes through the network.

FIG. 7*a* through 7*c* illustrate the relationship between the input lines (L), the output lines (L'''), and the permutation code (X) for each of these three distinct shifts. Wherever a blank appears in any of the charts of FIG. 7*a* through 7*c* the indication is made that that position could be either a 1 or 0. For a shift of one, shown in FIG. 7*a*, it can be noted that four of the input lines will have a binary vector index ending in 0 and will thus require a permutation code of 001 to shift that line up one position to – –1. Two of the input lines will have a binary vector ending in 01 and therefore will require a permutation code of 011 in order to shift up one position to output line —10. Similarly, input lines $L_3$ and $L_7$ will require permutation codes of 1 1 1 to shift up one position to output lines $L'''_4$ and $L'''_0$ respectively. FIGS. 7*b* and 7*c* illustrate these permutation code requirements for shifts of two and four respectively.

Now, consider FIGS. 7*a* through 7*c* in conjunction with FIGS. 8*a* through 8*c* which illustrate the operation of the permutation network in shifts of 1, 2, and 4 respectively, and FIG. 9, which illustrates the block diagram and inter-level wire connections for the permutation network under consideration. The three rows of dark circles indicated by numerals 10, 12, and 14 in FIGS. 8*a* through 8*c* represent the three rows of data selectors in the permutation network; S, S', and S''. Note that from FIG. 7*a* for a shift of one position, all input lines require that $x_0 = 1$. Consequently, in the level 0 data selectors in FIG. 9, $S_0$ through $S_7$, the even numbered input lines will be shifted once to the left and the odd numbered input lines will be shifted once to the right. FIG. 7*a* indicates that the even numbered input lines require $x_1 = 0$, and the odd numbered input lines require $x_1 = 1$. Consequently, the odd numbered data selectors in level 1 require channel select inputs of $x_1 = 0$, and the even numbered data selectors in level 1 require channel select inputs of $x_1 = 1$. As a result, data selectors (S') shift input lines $L_1$ and $L_5$ two places to the left, $L_3$ and $L_7$ two places to the right, and the other input lines are not shifted at all. Therefore, as can be seen from both FIG. 8*a* and FIG. 7*a*, only two of the input lines, $L_3$ and $L_7$, will require any shifting in the data selectors of level 2. Consequently, $S_0''$ and $S_4''$ will require channel select inputs of $x_2 = 1$, and all other (S'') selectors will require channel select inputs of $x_2 = 0$. The outputs of the (S'') data selectors are the input lines shifted once to the left. FIGS. 8*b* and 8*c* illustrate the permutation operations for a shift of two and a shift of four respectively. By following through the various shifting operations as illustrated in FIG. 8*a*, it can be seen that a permutation network may be constructed so as to be capable of shifting if a plurality of channel select input lines (permutation code lines) are used. Note that for any particular shift of 1, 2, or 4, $x_0$ is the same for all L. Therefore the data selectors $S_0$ through $S_7$ may be tied to the same channel select line, $x_0$. Likewise, for a shift of 2 or 4, $x_1$ is the same for all input lines, but for a shift of one, data selectors $S'_1$, $S'_2$, $S'_4$, and $S'_6$ requires $x_1 = 1$. Therefore, two channel select input lines are required to control the $x_1$ element of the permutation code. Similarly, in a shift of one, data selectors $S''_1$, $S''_2$, $S''_3$, $S''_5$, $S''_6$, and $S''_7$ require that $x_2 = 0$ while data selectors $S''_0$ and $S''_4$ require $x_2 = 1$; in a shift of two, data selectors $S''_2$, $S''_3$, $S''_6$, $S''_7$, require $x_2 = 0$ and data selectors $S''_0$, $S''_1$, $S''_4$, and $S''_5$ require that $x_2 = 1$; and in a shift of four, all (S'') require $x_2 = 1$. Consequently, it can be seen that the $x_2$ element of the permutation code will require three lines to the data selectors; data selectors $S''_0$ and $S''_4$ may be tied together, $S''_1$ and $S''_5$ may be tied together, and $S''_2$, $S''_3$, $S''_6$, and S'' may be tied together. By providing for this plurality of permutation code input lines, the permutation network has now been designed such that is may either permute the data into or out of the data interface in accordance with the storage pattern of the memory array as previously described, or it may shift the data such that each bit of data maintains its same relative position to all other bits of data but its absolute position in either the data interface or the memory array is changed.

FIG. 10 illustrates the 8-input permutation network described above. It can be observed that the permutation network requires one $x_0$ line; two $x_1$ lines, $x_{1,0}$ and $x_{1,1}$; and three $x_2$ lines, $x_{2,0}$, $x_{2,1}$, and $x_{2,2}$. When the network is operating in a shifting mode, the shift select circuitry will determine the state of the channel select lines in accordance with the shift to be executed.

It follows by analogy to the above described 8-input permutation network that a permutation network of any size may be constructed such that it has a shifting capability. The 256-input permutation network described earlier may be designed such as to have shifting capabilities of 1, 2, 4, 8, 16, 32, 64, and 128 places. To have this type of shifting capability, the permutation network would require one $x_0$ line, two $x_1$ lines, three $x_2$ lines, four $x_3$ lines, five $x_4$ lines, six $x_5$ lines, seven $x_6$ lines, and eight $x_7$ lines. It can be seen then that a permutation network can be made to have a shifting capability by providing $$\sum_{i=1}^{n} i$$

channel select input lines rather than the *n* channel select input lines required merely for the permutation technique.

It has been shown that using commonly available data selectors a permutation network may be constructed such that the data order out of the network will bear a constant relationship to the data order into the network; that order depending upon a permutation code, X. Such a permutation network having $2^n$ inputs would require only *n* permutation code lines to drive the channel select inputs of the data selectors. The data on any one of the $2^n$ inputs would evidence itself on any one of the $2^n$ outputs depending upon the permutation code, X. Such a permutation network may readily be designed so as to have the desirable programming capability of shifting. By providing a minimal amount of shift select circuitry and a plurality of channel select input lines to the data selectors, a $2^n$-input permutation network may be designed to have the capability of performing shifts of $2^0$, $2^1$, $2^2$, . . . , and $2^{n-1}$ positions. Shifts of any number of positions may be accomplished by making a plurality of appropriate passes through the permutation network in the shifting mode.

As can be seen, the instant invention may provide for the permuting of the order of data out of a data interface and into a multi-dimensional-access solid-state memory or out of such memory and into the data interface such that the data in the data interface will consistently be in the same order; that order depending only upon the mode of access to the MDA array. It further provides for all possible shifts of such data. It performs both of these functions by means of a network which requires a minimum amount of logic and control circuitry and of such character that large networks may be constructed of smaller identical networks of such size that each may be uniquely arranged on its own individual printed circuit board. As a result, a minimum amount of interboard wire connections are necessary and maintainability is simplistic.

In accordance with the patent statutes while only the best known embodiment of the invention is illustrated in detail, it is to be understood that the invention is not limited thereto or thereby, but that the inventive scope is defined in the appended claims.

What is claimed is:

1. A network of logic circuitry for permuting the lineal order of data from $2^n$ data sources each designated by an *n*-element binary vector index M, unique for each source, to $2^n$ data positions each designated by an *n*-element binary vector P, unique for each data position, in accordance with the state or a permutation code designated by an *n*-element binary vector X such that the permuted data position P of the data from any data source M is given by $P = M \oplus X$, where $\oplus$ means addition modulo 2 and where *n* is an integer greater than 1, comprising:

a plurality of *k*-channel data selectors having channel select input lines and arranged in *r* levels, 0 through $(r-1)$, of $2^n$ data selectors each, wherein *k* has the same value, $k_z$, for all data selectors within a given level $z$ but may have different values for each level such that $$n=\sum_{z=0}^{r-1}\log_2 k_z$$

the data selectors of each level $z$ being grouped in groups of $k_z$ according to the commonality of $(n\text{-}\log_2 k_z)$ of the elements of their binary vector indices, the data selectors of level 0 being grouped according to the commonality of the most significant $$\left[\sum_{j=0}^{z-1}\log_2 k_j\right]$$

and the least significant $$\left[n-\sum_{j=0}^{z}\log_2 k_j\right]$$

elements of their binary vector indices such that the data selectors of level $(r-1)$ are grouped according to the commonality of the least significant $[n-\log_2 k_{(r-1)}]$ elements of their binary vector indices, the data sources M being grouped according to the commonality of the most significant $(n-\log_2 k_o)$ of the elements of their binary vector indices, each group of data sources being connected to the inputs of that group of data selectors in level 0 which have the same commonality of binary vector indices as do the data sources, the output of each of the data selectors being accorded the same binary vector index as its associated data selector, the output of the data selectors of each level $z$ being grouped according to the same commonality of elements of their binary vector indices as are the data selectors of the level $(z+1)$, the groups of data selector outputs of each level $z$ being connected to the inputs of the data selectors of level $(z+1)$ having the same commonality of elements of their binary vector indices as do the outputs of level $z$, the output of each of the data selectors of level $(r-1)$ being connected to the data position having the same binary vector associated therewith; and circuit means having $n$ outputs, one output for each of the $n$-elements of the vector X, the state of the outputs being respectively controlled by the corresponding values of the elements of the vector X, each level receiving $\log_2 k_z$ of the outputs, level 0 receiving the least significant outputs and progressively thereon such that level $(r-1)$ receives the most significant outputs, the outputs being connected to the channel select input lines of the data selectors of each level.

2. The network of logic circuitry as recited in claim 1 wherein the $k$-channel data selectors are identical for all levels, the network comprising $r2^n$ $k$-channel data selectors arranged in $r$ levels of $2^n$ data selectors each.

3. The network of logic circuitry as recited in claim 1 wherein the circuit means comprises an $n$-bit binary data register.

4. The network of logic circuitry as recited in claim 1 wherein the corresponding channel select input lines of the data selectors within each level are connected parallel to corresponding output of the register.

5. The network of logic circuitry as recited in claim 1 wherein the number of functionally distinct connections made between the circuit means and the channel select input lines is equivalent to $$\sum_{i=1}^{n} i$$

.

* * * * *

UNITED STATES PATENT OFFICE
CERTIFICATE OF CORRECTION

Patent No. 3,812,467 Dated May 21, 1974

Inventor(s) Kenneth E. Batcher

It is certified that error appears in the above-identified patent and that said Letters Patent are hereby corrected as shown below:

Column 6, line 51, before "group" insert -- if $x_o$=1, then the --. line 56, between $1_o$ and $x_o$ insert -- $\oplus$ --. Column 7, line 31, "S", second occurrence, should read -- $\tilde{S}$ --; line 32, cancel "~" from 8. Column 13, claim 1, lines 11 through 18, the equations should be interchanged.

Signed and sealed this 15th day of October 1974.

(SEAL)
Attest:

McCOY M. GIBSON JR.
Attesting Officer

C. MARSHALL DANN
Commissioner of Patents